(12) United States Patent
Dunton et al.

(10) Patent No.: US 6,304,284 B1
(45) Date of Patent: *Oct. 16, 2001

(54) METHOD OF AND APPARATUS FOR CREATING PANORAMIC OR SURROUND IMAGES USING A MOTION SENSOR EQUIPPED CAMERA

(75) Inventors: Randy R. Dunton, Phoenix; Thomas Mark Charlesworth, Scottsdale, both of AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,458

(22) Filed: Mar. 31, 1998

(51) Int. Cl.[7] .................................................. H04N 7/00
(52) U.S. Cl. .............................................. 348/36; 348/37
(58) Field of Search .................................. 348/36, 37, 38, 348/39; 359/209, 211, 277; 396/322, 20, 21, 22, 23, 24; 382/284, 294; H04N 7/00

(56) References Cited

U.S. PATENT DOCUMENTS

| | | | |
|---|---|---|---|
| 4,138,190 | * | 2/1979 | Bryngdahl ............................. 350/3.7 |
| 4,138,196 | * | 2/1979 | Redman ............................. 350/96.11 |
| 4,754,327 | * | 6/1988 | Lippert .................................... 358/88 |
| 4,895,431 | * | 1/1990 | Tsujiuchi et al. .................... 350/320 |
| 4,991,944 | * | 2/1991 | Hirao et al. .......................... 358/277 |
| 5,045,872 | * | 9/1991 | Yoshimura et al. ................... 354/94 |
| 5,262,867 | * | 11/1993 | Kojima ................................ 348/208 |
| 5,267,042 | * | 11/1993 | Tsuchiya et al. .................... 358/209 |
| 5,649,032 | * | 7/1997 | Burt et al. ............................. 382/284 |
| 5,650,813 | * | 7/1997 | Gilblom et al. ........................ 348/36 |
| 5,659,195 | * | 8/1997 | Kaiser et al. ......................... 257/415 |
| 5,940,641 | * | 8/1999 | McIntyre et al. .................... 396/332 |
| 5,999,211 | * | 12/1999 | Hedges et al. ....................... 348/144 |
| 6,078,701 | * | 6/2000 | Hsu et al. ............................. 382/294 |

\* cited by examiner

*Primary Examiner*—Howard Britton
*Assistant Examiner*—Nhon T. Diep
(74) *Attorney, Agent, or Firm*—Blakely, Sokoloff, Taylor & Zafman LLP

(57) ABSTRACT

A camera system for generating panoramic images is described. The camera uses sensors to determine the orientation of the camera as each image is recorded. The orientation information is recorded in memory. A processor reconstructs a single panoramic image from the recorded images using the recorded orientation information.

25 Claims, 7 Drawing Sheets

METHOD OF AND APPARATUS FOR CREATING PANORAMIC OR SURROUND IMAGES USING A MOTION SENSOR EQUIPPED CAMERA

BACKGROUND OF THE INVENTION

(1) Field of the Invention

The present invention relates generally to generating composite images. More particularly, the present invention relates to using motion sensors to determine movement and orientation of a camera. The data from the motion sensor is combined with multiple images taken by the camera to generate a large composite image.

(2) Related Art

Photographic and imaging systems utilize lenses which have limited fields of view. When a wider field of view is desired, a wide angle lens is used to generate a panoramic photo. A wide angle lens has the disadvantage that the lens typically produces distortion at the edges of the image. A second disadvantage of the wide angle lenses is that more subject matter is recorded per square millimeter of film resulting in a less detailed image being recorded. One method of solving the problem is to use multiple cameras or electronic sensors to record multiple images. The multiple images are subsequently recombined to produce a composite image.

In order to record scenes outside the field of view of wide angle lenses, traditional panoramic imaging systems utilized multiple cameras or a rotating camera with an automatic film advance. Preferably, the relationship between the multiple cameras was fixed. Thus, when the images were recombined, the information relating to the images was known because of the fixed relationship between the cameras. A disadvantage of such systems is that multiple cameras typically require multiple lenses, and multiple camera bodies. Thus, multiple camera systems may be bulky and are more expensive than a single camera arrangement.

Another method of generating a series of images uses a person manually moving a lens system to record a sequence of images. However, such movement often results in excessive overlap between recorded images. The excessive overlap represents excess data which consumes large amounts of memory. Excessive overlap also requires the recording of extra images. These extra images must also be stored and processed.

Attempts to reduce overlap may result in a failure to record sufficient information. A failure to record sufficient information may produce gaps between images making it difficult to reconstruct a composite image. Thus, it is desirable to design a system which can quickly and easily generate multiple images with optimum overlap regions for combination into a single composite image. Such a system will be described in the following application.

BRIEF SUMMARY OF THE INVENTION

A system for generating a composite image is described. The system includes an imaging apparatus configured to record a first image at a first orientation and a second image at a second orientation. A sensor detects reorientation of the imaging apparatus. A processor is configured to generate a panoramic image by combining together the first image and the second image using an output of the sensor.

DETAILED DESCRIPTION OF THE INVENTION

In the following description, various embodiments of a system for using a single camera with a single lens system to generate composite images, including both surround images and panoramic images, will be described. Camera, as used in this application, is broadly defined to include any imaging apparatus which records the image of an object. Thus, cameras include video cameras, digital camera and conventional film cameras. Panoramic images are images covering large areas, typically beyond the field of view of a wide angle lens. Panoramic images include surround images which are images projected in an arc around a viewer, typically an arc of 360° completely surrounding the user.

In one embodiment, a camera includes a set of motion sensors, such as micro-machined silicon ("MEMS") sensors. A MEMS sensor can detect linear and rotational acceleration or movement of the camera, and thus, can compute movement of the camera to determine orientations and locations at which a camera is located. Another type of motion sensor which may be used is a vibrating MEMS sensor or commercially available laser gyro. Using the position information including camera orientation information and the at least two images taken by the camera, a processor can recreate a composite or panoramic image of a subject.

In the accompanying description, certain details will be provided to facilitate understanding of the invention, and should not be interpreted to limit the scope of the invention. For example, the specification will describe the invention using particular MEMS sensor types such as micro-machined accelerometers. However, it is recognized that other position sensors or motion detectors may be used. The actual sensor used will depend on the cost of the sensor, whether a sensor can provide data with sufficient accuracy, the power consumption of the sensor, and the size of the sensor.

Figure 1A:
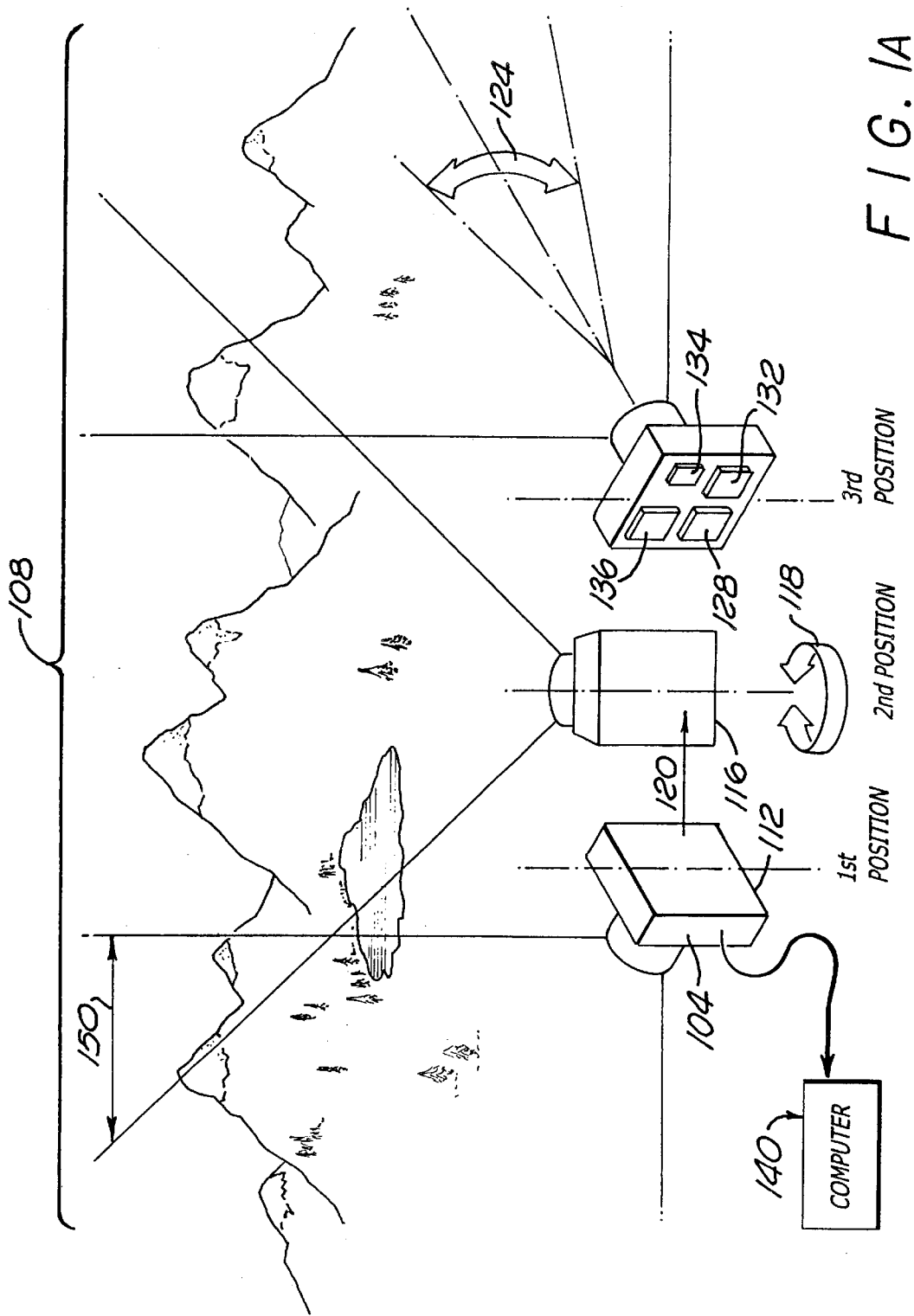
FIGS. 1A and 1B illustrate different embodiment of an imaging system for accumulating images used to generate a composite image.

One embodiment of a camera for generating a panoramic image is illustrated in FIG. 1A. In FIG. 1A, a camera 104 is used to generate a composite image of a subject 108. The subject is typically a scene or image across a wide area. The camera is in a first position 112 when the first image is taken. After the first image is taken, the camera is moved to a second position 116. The movement may include a rotation as illustrated by arrow 118 and a lateral translation illustrated by arrow 120. The movement may also include a tilt as illustrated by arrow 124. In one embodiment, a motion sensor 128 within the camera 104 detects the movement of the camera. In order to detect tilt, lateral, and rotational movements, motion sensor 128 may be implemented using multiple MEMS sensors. For example, in one embodiment of the camera, motion sensor 128 may include a first MEMS sensor to detect lateral acceleration 120, a second MEMS sensor to detect rotation 118 and a third MEMS sensor to detect tilt 124. In the embodiment illustrated in FIG. 1A, lateral movements are minimized allowing operation using only two MEMS sensors. Preventing tilt would allow the camera to operate with only one MEMS sensor for detecting camera rotation.

In one embodiment, MEMS sensor 128 is an inertial sensor. Such sensors are based on comb drive actuator technology described in an article entitled "Laterally Driven Polysilicate Resident Micro structures", by W. C. Tang, T. C. Nguyen and R. T. Howe, proceedings IEEE Microelectromechanical Systems Workshop, Salt Lake City, Utah, U.S.A., Feb.1989, pages 53–59. An example of an appropriate accelerometer is a 50N1G accelerometer from Analog Devices of Norwood, Mass. Analog Devices also produces integrated BiCMOS, a complimentary metal oxide semiconductor device merged with a micro machine sensor for determining device rotation. These sensors are being used in advanced automotive braking systems. These sensors are being commercialized by General Motors of Detroit, Mich. and are described in the article "Overview Of MEMS Activities In The U.S." by C. H. Mastrangelo who is with the Center for Integrated Sensors and Circuits, Department of Electrical Engineering, University of Michigan, Ann Arbor, Mich. The article from Mastrangelo also describes alternative embodiments of motion sensors, including optical actuators which may be used to determine the motion of a camera. By integrating the acceleration of the camera, a velocity can be developed. A second integration of the velocity generates a displacement of the camera. This displacement information may be used to determine a second position 116 of a camera 104 when the second image is taken with respect to the first position 112 and orientation of the camera 104.

The relative orientations and positions of the camera 104, including both the first position 112 and the second position 116, are recorded either in a memory device 132 in the camera 104, or in an alternative embodiment, the data may be stored in an external memory coupled to the camera. In one embodiment, memory devices also record data which may facilitate reconstruction of a composite image including data on the distance from the camera to the subject, and the focal length of the lens (and, thus, the field of view of the lens). Distance from the camera to the subject may be determined by using focusing information from the lens. Alternatively, sonar sensing of the distance may also be implemented. Knowledge of the focal length of the lens enables determination of the field of view which assists in computing overlap regions 150.

Some motions sensors, such as sensors which measure acceleration, may not produce position data. In these embodiments, data describing the motion of the camera, such as acceleration data, may also be recorded in memory. At a later time, a processor uses the motion data to compute position data. The respective motion or position and orientation data are organized to allow correlation of each image recorded with a corresponding position, such as first position 112 or second position 116.

Each image recorded may be recorded on photographic film, or more preferably, using electronic sensors 134. In one embodiment, the electronic sensors are Complementary Metal Oxide Semiconductor (CMOS) sensors. In alternate embodiments, photo sensing charge couple device (CCD) arrays or photo-diodes may be used. The electronic image output by the electronic sensors are stored in a second memory device 136. If the image was recorded on photographic film, the image is converted to an electronic form for further processing. The conversion may be accomplished using a scanner or other methods of converting chemical or light data to electronic data. Such scanners are commercially available from several vendors, including Hewlett Packard of Palo Alto, Calif. The digital image is stored in second memory device 136.

Figure 1B:
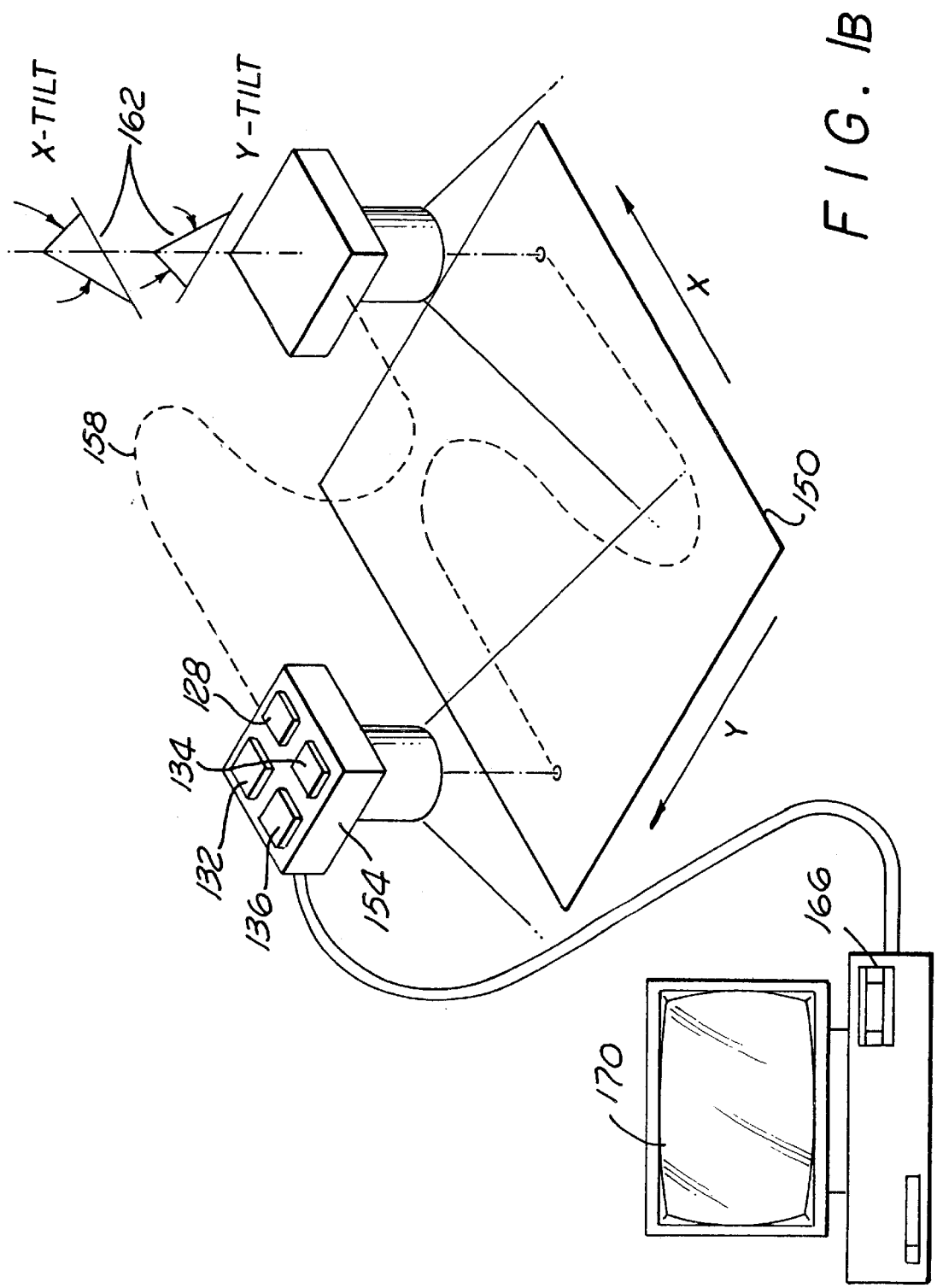

A second embodiment of the invention is illustrated in FIG. 1B. In FIG. 1B, a two-dimensional subject 150 is placed on a flat surface. A person manually moves the camera 154 along a path 158 performing a lateral translation preferably in a plane parallel to the surface of the two-dimensional subject. A feedback mechanism (not shown) may prompt the user to help the user keep the camera in the plane. Alternatively, a motion sensor may detect when the camera 154 moves out of the plane and records the movement in the memory device 132. In the illustrated embodiment of FIG. 1A, rotation and tilt 162 of the camera 154 is minimized. However, when rotation and tilt are present, the rotation and tilt are measured and recorded.

In one embodiment, a personal computer 166 coupled to the camera 154 processes the scanned data and the motion sensor 128 output in real time and displays the output on a display device 170. The real time display on display device 170 allows the user to move the camera 154 back over missed areas to retrieve missing data and generate a complete scanned composite of two-dimensional subject 150.

In the embodiments shown in FIG. 1A and the embodiment shown in FIG. 1B, a processing unit 140 of FIG. 1A retrieves the images and the corresponding position and orientation information and recombines them into a single, panoramic image. One embodiment of the processing unit 140 is a general microprocessor executing a program to handle graphics processing functions. Various methods of processing images to generate a composite image are known; one method will be described in FIG. 4.

Figure 2:
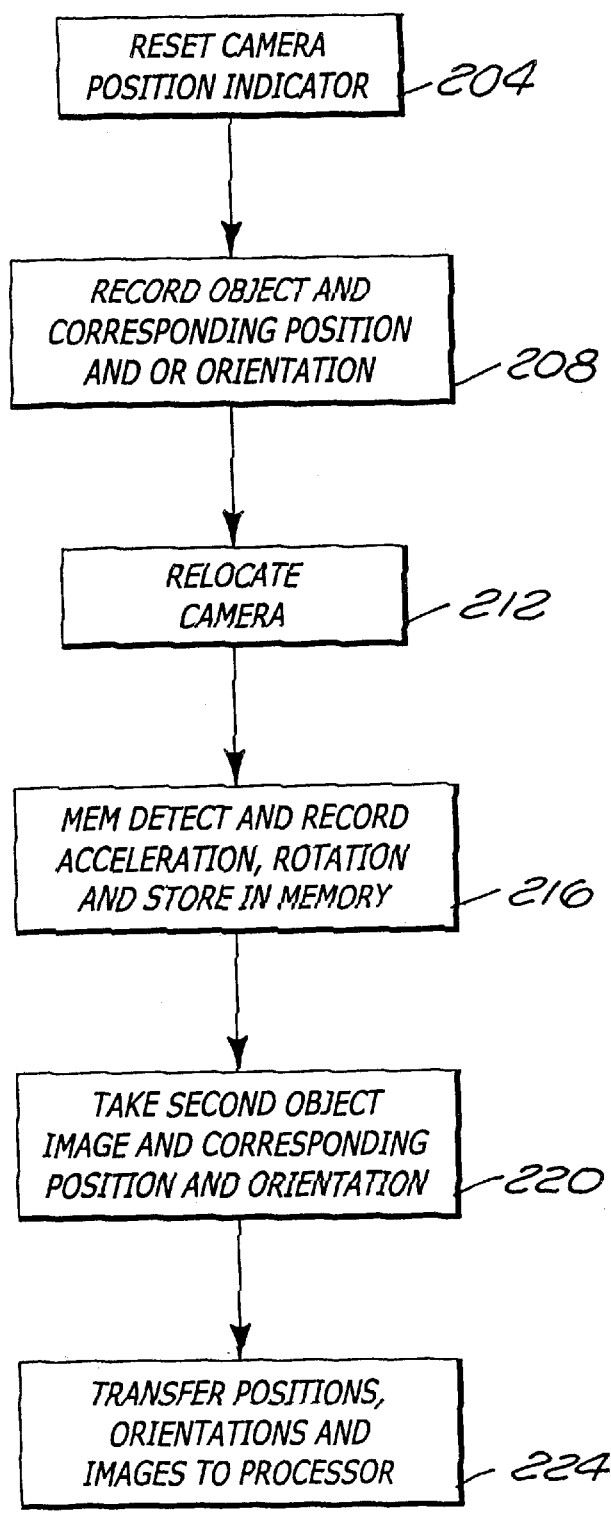
FIG. 2 is a flow diagram describing the process of generating two images using the imaging apparatus of FIG. 1.

FIG. 2 illustrates a flow chart describing the operations used to create a panoramic image using the camera of FIG. 1A. In block 204, before the first image is taken, the user resets a camera position indicator. In this embodiment, the resetting of the camera position indicator clears the memory storing output of the motion sensor, such that the first image recorded in a sequence is at a zero point reference frame. The camera records an image of a subject at the zero point reference frame in block 208. At approximately the same time as the recording of the first image occurs, a corresponding position and orientation of the camera is recorded in memory 132 of FIGS. 1A and 1B. In the camera of FIG. 1A, a CCD array generates the image stored in the second memory 136 of FIG. 1A.

After the camera has recorded the first image and corresponding position and orientation information, the camera is repositioned or reoriented as set forth in block 212. The movement may involve a lateral translation 120 and/or orientation (rotational) movement. Either a person or a motor driven apparatus may move the camera. In one embodiment, the camera rotates on a tripod, minimizing lateral movements and tilt and avoiding the need to measure lateral movement and tilt movements. During the repositioning, a sensor, such as a MEMS sensor, records the movement of the camera as in block 216. The MEMS sensor records acceleration and integrates the acceleration to generate a displacement. The recorded acceleration, rotation or displacement information is stored in a memory device.

When the camera is oriented at a second position, the camera records a second image of the subject. As the second image is recorded, the camera uses information from the motion sensor and records a camera position and orientation corresponding to the second image. The position and orientation information is stored in a position and orientation memory device 132 of FIGS. 1A and 1B. The second image and the first image must have a sufficient amount of subject matter overlap 150 so that the processor will be able to reconstruct the overlapping regions and generate a stitched panoramic image.

The prior sequence of blocks 204 through 220 described a system as used in a still camera. It is contemplated that a MEMS or motion sensor may be installed in a video camera and many images taken as the camera moves. Each image corresponds to a set of position and orientation data generated from information recorded by the motion sensors. These images may then be reconstructed with neighboring images to generate a comprehensive panoramic image. The techniques described in the reconstruction of such a moving image are accomplished by repeated iterations of blocks 204 through 220 and a series of reconstruction blocks executed by the processor. In block 224, the position and orientation information generated by the motion sensor, along with the corresponding recorded images, are transferred to a processor 140 of FIG. 1A.

Figure 3A:
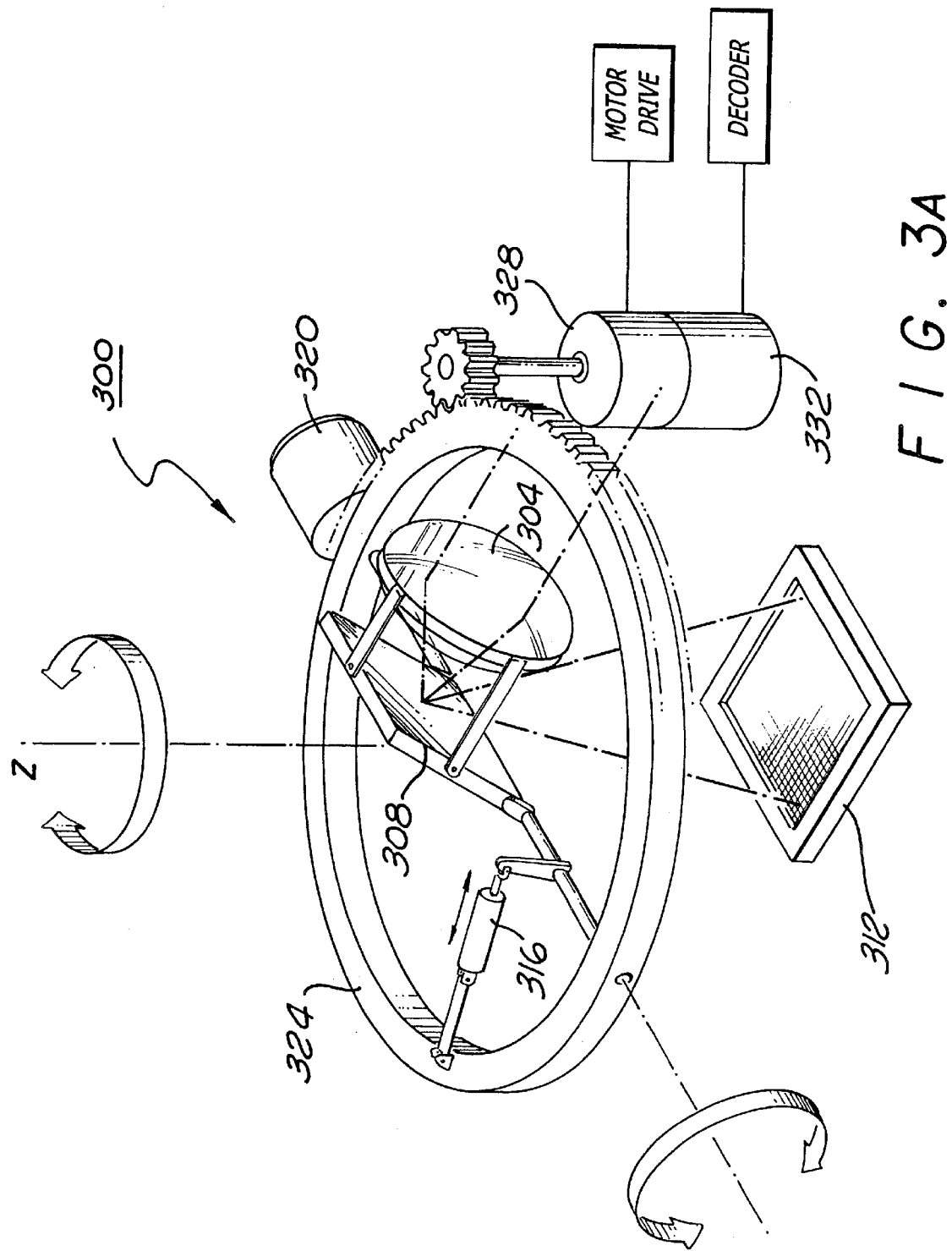
FIG. 3A illustrates a second embodiment of the invention for generating a surround image.

FIG. 3A illustrates one embodiment of a camera system 300 for recording a surround or hemispherical image. Light from a subject passes through a lens system 304 which generates an image of the subject on mirror 308. Mirror 308 directs the image to a sensor 312. Sensor 312 may be a photographic film, a CCD array or a CMOS device. The output of sensor 312 is stored in a memory device (not shown).

In the illustrated embodiment, an assembly including lens system 304, mirror 308 and sensor 312 are mounted together in fixed relation to each other such that mirror tilt actuator 316 can tilt the assembly along a first degree of freedom to record portions of the subject above and below (along the y-axis) a particular point. The degree of tilt is recorded in one type of sensor, an encoder 320, which records the amount of tilt when an image is recorded.

In the illustrated embodiment, the lens assembly 304 including lens system 304, mirror 308 and sensor 312 are also mounted on a free rotating ring 324 which rotates the assembly 304 along a second degree of freedom to record portions of the subject to either side (along the x axis) of a point. Movement or rotation may be executed by a motor 328 coupled to the free rotating ring 324. A shaft encoder 332 serves as a motion sensor to determine and record the position, including orientation, of free rotating ring 324 at each point in which an image is recorded.

Figure 3B:
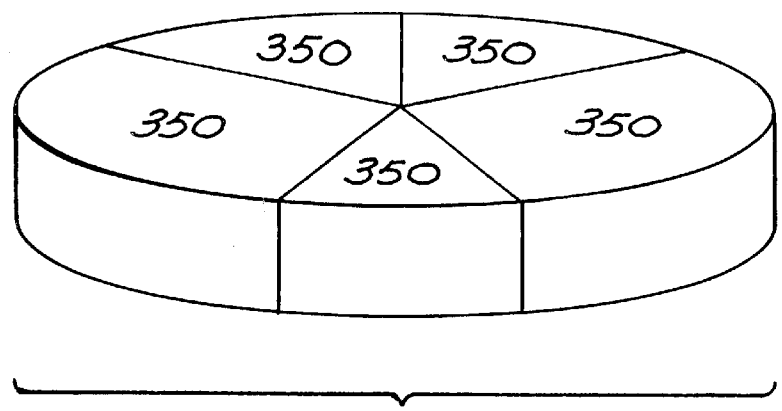
FIGS. 3B and 3C illustrate regions which may be imaged by the apparatus of FIG. 3A.

The camera system 300 of FIG. 3A can be used to record images used in generating composite images with minimal overlap regions. In a first application, the system may be used to record a surround image in a cylindrical format. When the camera system 300 is used to record a cylindrical format surround image, mirror tilt actuator 316 maintains the lens 304 and mirror 308 at a constant tilt while a motor 328 rotates the camera system 300 in a circle. The images recorded by the camera system 300 represents a cross section of a cylinder at a preset tilt. At preset angular positions along the circle, images are recorded allowing a processor (not shown) to recombine the recorded images to generate a cylindrical image. The sections to be combined are similar to assembling sections 350 of a pie 352 of FIG. 3B. The preset angular positions take into account the field of view of the camera system 300 and the overlap region desired between adjacent images. Adjacent images are defined to be images which share an edge or an overlap region. Consecutive images are defined to be images which are recorded sequentially in time. The motion sensor or motor encoder can be used to determine when camera system 300 has reached the preset angular positions and indicate that an image is to be recorded.

Figure 3C:
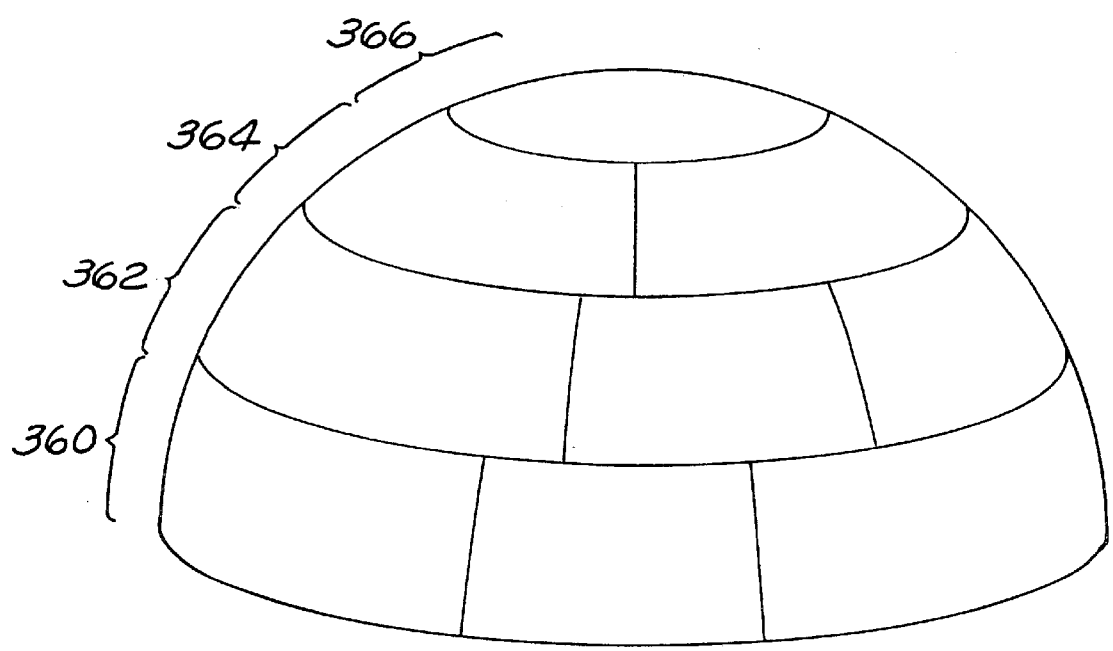

Camera system 300 can also be used to record a hemispherical format surround image. One method of recording a hemispherical format surround image utilizes sequentially recording several cylindrical format surround images 360, 362, 364, 366 as shown in FIG. 3C. After a surround image at a given tilt is recorded, the mirror tilt actuator 316 is changed to an adjacent preset tilt position so that the camera system 300 records a different cylindrical format surround image with each revolution of camera system 300. The preset tilt positions take into account the field of view of the camera system 300 in the direction of the tilt and the overlap region desired between the top edge and the bottom edge of adjacent cylindrical format surround images in the arc. A motion sensor or tilt encoder 320 determines when camera system 300 has reached the preset tilt position.

Figure 4:
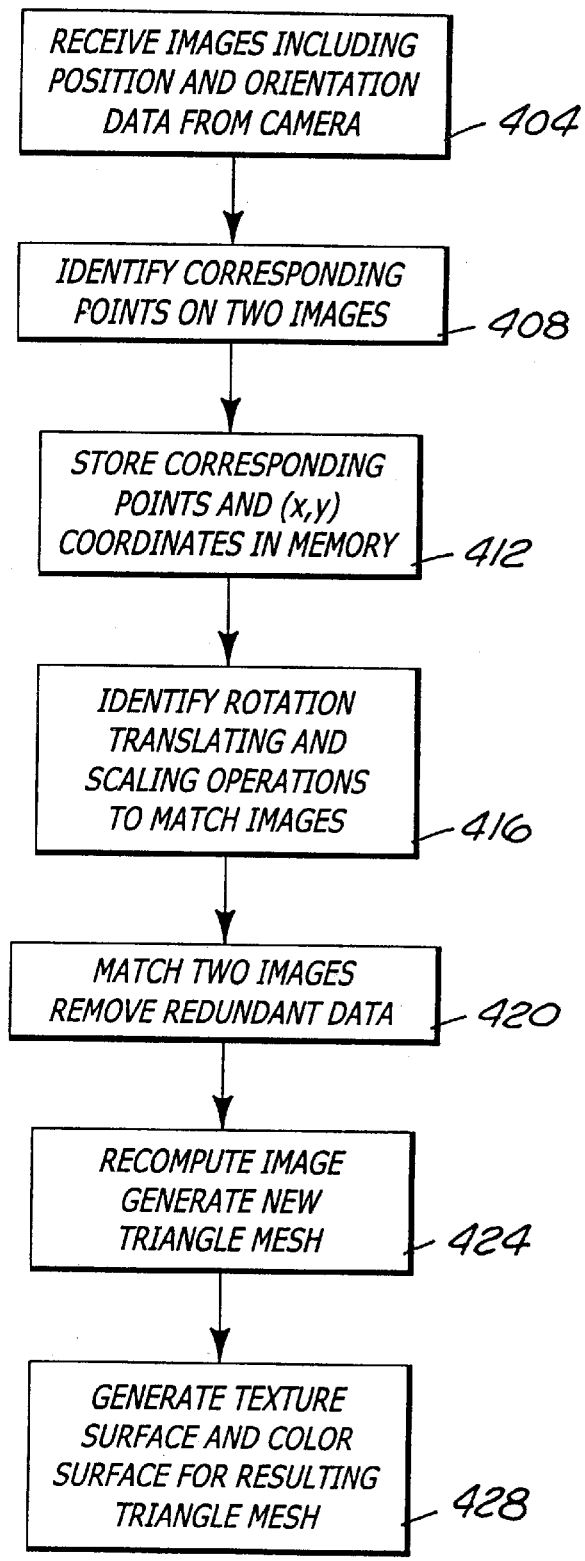
FIG. 4 is a flow diagram describing the process of combining two images to form a single composite image.

FIG. 4 is a flow diagram describing the steps taken by the processor or processing unit 140 of FIG. 1A to reconstruct a composite image from two or more images using corresponding position and orientation data. In step 404, the processor receives camera position and orientation information and the corresponding image data from the camera. The processor then selects corresponding points in a first and second image in step 408. Corresponding points are points in different images or perspectives which correspond to the same point in a subject. Thus, a corresponding point is a point or pixel in the first image which corresponds to a point on the subject, and a second point or pixel in the second image which corresponds to the same point on the subject. The point in the first image and the point in the second image are defined to be corresponding points. For example, the tip of a person's nose is a point on the subject which may have a corresponding point in both a first and a second image. In one embodiment of the invention, pattern recognition software is used to determine corresponding points. A second, simpler method of determining corresponding points involves an end user, which selects a point in the first image, selects or "clicks" on the first point using a mouse or other pointing device, and selects or "clicks" on the corresponding point in the second image. In a preferred embodiment, at least three corresponding points are chosen for each overlap region. An overlap region is the redundant data region where two image are being combined. In step 412, the selected corresponding points and their x,y coordinates are recorded in a record stored in a memory device. The record is typically a two-dimensional record, because an x and y coordinate must be recorded for each point.

In step 416, the processing unit identifies operations which can be used to manipulate the first and the second images such that the corresponding points in the two images match. In particular, step 416 involves identifying rotation, translation and scaling operations to be performed on at least one of the two images. In order to determine the operations for matching the corresponding points, data from the motion sensors may be used. If the motion sensors are accurate and sensitive enough, the identification of corresponding points may be unnecessary because the movement of the camera in relation to a fixed subject may be mathematically computed to determine alignment of the images. In the generation of a typical cylindrical surround image, tilt and lateral movement are minimized and information regarding the distance from the lens to the subject and the focal length of the lens (and, thus, the field of view) has been recorded. Such information simplifies the rotation, translation and scaling operations performed by the processing unit to achieve an overlap region that is properly aligned between two images.

When data is electronically stored, the overlap region between the two images typically has twice the data necessary to generate an image of the overlap region. In order to reduce data redundancy, the extraneous data in one data image may be removed. In an alternate method of combining data, an interpolation or averaging of the data from two images in the overlapping region may occur between the two data sets to generate a single data set representing the overlap region. The decision on whether to average or interpolate data or to remove data from one data image depends on the computational power of the processor and the accuracy of the rendition desired. Increased accuracy requires increased processing power which allows for averaging or interpolation of data in the overlap region.

In step 424, the parameters defining a resulting panoramic image are recomputed. For example, if the image being recombined is a three dimensional image, a recalculation of texture surfaces, color surfaces and triangle vertices, in a 3-D point set is executed to generate a new database containing the redefined building blocks or elements. These elements are typically triangles in a 3-D database. If the images being recombined are two-dimensional images, such a reconstruction of a mesh is unnecessary and the program is complete when a composite image combining the two images is generated.

When the images being recombined are three-dimensional images, the texture vertices of the 3-D point set, including new texture surfaces and new color surfaces must be computed in step 328. These newly computed texture and color surfaces are reapplied to the new texture vertices which were computed in step 424.

In summary, the process described in the flowchart in FIG. 4 allows a more comprehensive panoramic image to be generated from two images. The first image is generated by a camera which takes a first image at a first position. Sensors detect camera movement including changes in orientation of as the camera moves to a second position, where a second image is taken. By using the sensors' output, a processor can combine the first image and the second image to generate a comprehensive panoramic image.

The described system reduces costs because less equipment is needed. Specifically, only one lens system is needed. A single lens system makes the system less bulky than prior art panoramic imaging systems. Finally, the system described is suitable for video cameras, in which multiple images are taken. These multiple images may be combined to generate a moving panoramic or surround image database.

Figure 5:
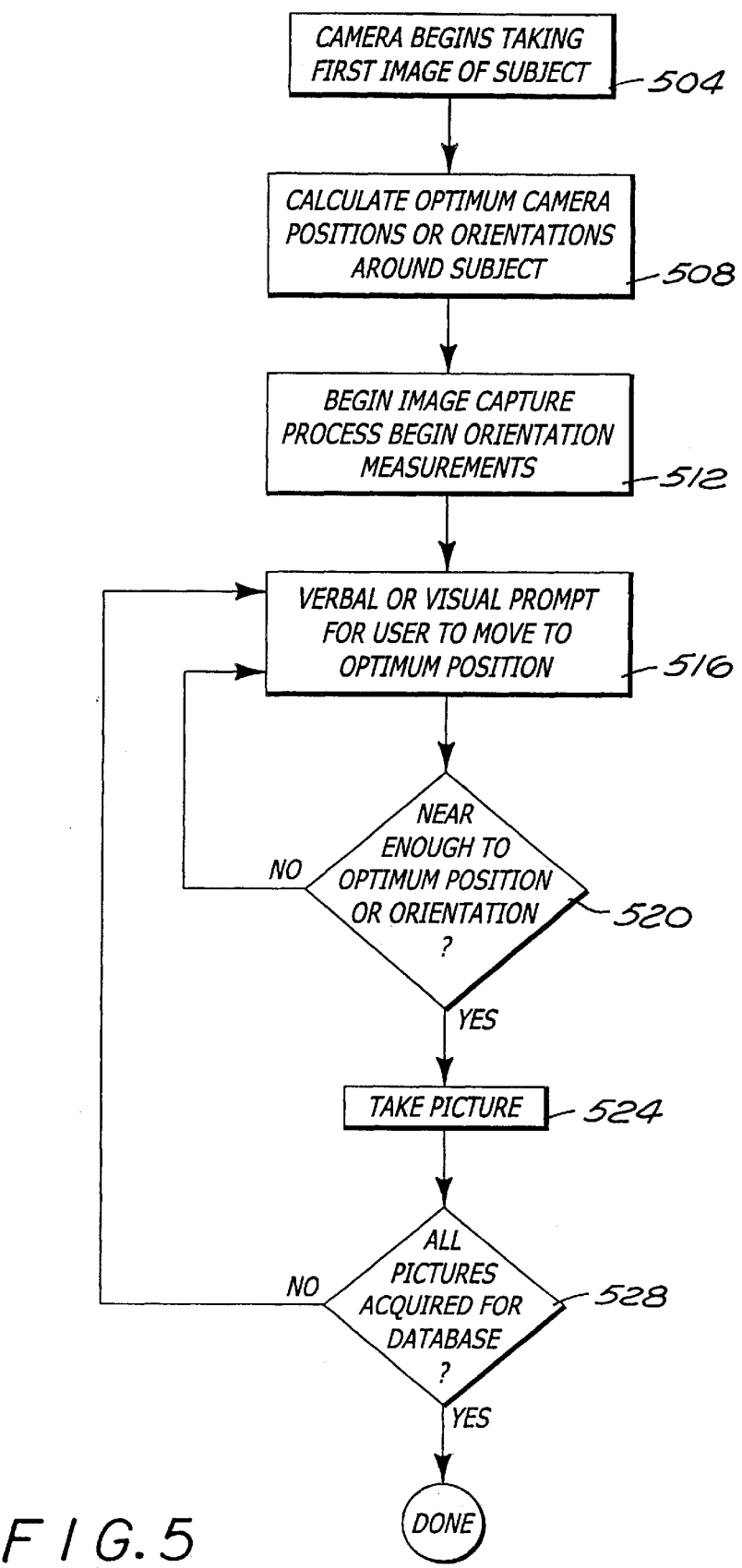
FIG. 5 is a flow chart describing a method for controlling movement of the imaging apparatus to optimize overlap regions.

The described system may be further refined to improve the ease of use and the data gathering capacity of the camera 104 or camera system 300. FIG. 5 is a flow chart describing a method to assist a user improve the data gathering capacity of camera 104 or camera system 300. In block 504, the camera takes a first image of a subject from a first position. The camera may then proceed to compute optimum camera positions from which to take subsequent images in block 508. In the camera system 300 of FIG. 3A, the optimum positions are typically those with the minimum required overlap. Thus, the camera may rotate a predetermined number of degrees after each recording of an image. The number of degrees depends on the field of view which in turn depends on the focal length of the lens 304. Information regarding the focal length and, thus, the field of view is stored (1) to allow determination of the number of degrees of rotation and (2) to assist reconstruction of the image. A wide angle lens allows more degrees of rotation between images thus requiring fewer images to be recorded to complete a circular surround image. A telescopic lens having a narrow field of view allows fewer degrees of rotation between recording of adjacent images.

In block 512, the camera begins an image capture sequence. Orientation measurements are taken to determine the orientation of the camera.

In camera systems based on manual movement of the camera, the camera prompts the user to move in block 516. In one embodiment, the prompts may be given in the form of arrows displayed in the camera viewfinder. The arrows prompt a user to move the camera in a particular direction, or rotate the camera to a particular orientation. The arrows may be displayed using a liquid crystal display (LCD). In one embodiment, an auto-ranging device, such as a sonar system, determines the distance from the object being imaged to the camera. The information from the auto-ranging device can be used to assist the user in keeping a camera such as the camera of FIG. 1B in a plane above a two-dimensional object 150. The distance information may also be stored to assist in combining multiple images.

A processor outputs signals through the LCD prompting the user to maintain the proper amount of overlap between sequential images. One method of measuring overlap may be accomplished by causing the processor to select a point on the subject at one edge of the field of view. The processor tracks the movement of the selected point across the field of view as the camera moves. The camera signals the user when the selected point reaches an area on the opposite edge of the field of view allowing the user to record a second image. In an alternate embodiment, a MEMS sensor may determine when a camera has been reoriented sufficiently to optimize the overlap region and justify the recording of a second image. The amount of reorientation depends on the field of view of the lens. In manually moved cameras, a visual, sound or voice signal may be used to tell the user to move the camera in a particular direction or rotate the camera to a particular orientation properly adjusting the overlap region.

In block 520, circuitry within the camera determines whether the camera is within a tolerance distance or orientation from an optimum position. If the camera is not within tolerance, the camera returns to block 516 prompting the user to further adjust the camera position in a feedback arrangement. If in block 520 it is determined that the camera is within the tolerance distance and orientation, the camera records a second, subsequent image of the subject in block 524.

In block 528, the camera determines whether all images necessary for a database have been recorded. The number of images needed is determined by the field of view of the lens, the amount of overlap desired, and whether a surround, a hemispherical or a panoramic image is desired. If additional images are needed, the camera returns to block 516 prompting the user to move the camera to a subsequent position for the recording of a subsequent image. When it is determined in block 528 that a sufficient number of images have been recorded, the recording of images is complete and a combined image may be reconstructed.

While certain exemplary embodiments have been described in detail and shown in the accompanying drawings, it is to be understood that such embodiments are merely illustrative of and not restrictive on the broad invention, and that this invention is not to be limited to the specific arrangements and construction shown and described, since various other modifications may occur to those with ordinary skill in the art.

What is claimed is:

1. A system for generating a composite image comprising:
   a camera configured to capture a first image at a first orientation and a second image at a second orientation, the second orientation defined such that an overlap of the first image and the second image is approximately a minimum required overlap;
   a sensor to detect reorientation of the camera from first the orientation to the second orientation;
   a notification device to communicate to a user when the camera has reached the second orientation; and
   a processor to generate a panoramic image by combining the first image, the second image and an output of the sensor.

2. The system of claim 1 wherein the sensor is a micro-machined silicon sensor.

3. The system of claim 1 wherein reorientation includes a relocation of the camera.

4. The system of claim 1 wherein the sensor is a laser gyro.

5. The system of claim 1 wherein the camera further comprises:
   a lens system; and
   an array of electronic sensors for capturing an electronic image.

6. The system of claim 5 wherein the electronic sensors are part of a charge coupled device array.

7. The system of claim 5 wherein the electronic sensors are part of a Complementary Metal Oxide Semiconductor sensor.

8. The system of claim 1 wherein the camera is a video camera.

9. A method of generating a panoramic image comprising:
   capturing a first image using a camera oriented in a first orientation;
   reorienting the camera to a second orientation, the reorienting performed by a user of the camera;
   obtaining data sufficient to define the reorientation of the camera between the first orientation and the second orientation;
   capturing a second image responsive to a notification to the user that the camera is in the second orientation such that an overlap of the first image and the second image is approximately a minimum required overlap; and
   combining the first image and the second image to form the panoramic image.

10. The method of claim 9 wherein combining the first image and the second image further comprises:
    selecting corresponding points on the first and second images; and
    deriving from the corresponding points rotation, translation and scaling information used to combine the first image and the second image.

11. The method of claim 9 wherein obtaining data sufficient to define the reorientation of the camera comprises:
    detecting an acceleration; and
    obtaining the acceleration and a time of duration of the acceleration to enable a processor to compute a displacement of the camera.

12. The method of claim 10 further comprising: generating a mesh of triangles to simulate a three-dimensional surface.

13. A method of prompting a user to capture a panoramic image of a subject comprising:
    determining a field of view of a lens in a camera;
    capturing a first image while the camera is in a first position;
    prompting a user to move the camera to a second position suitable for capturing a second image for use in constructing a panoramic image of the subject; and
    capturing the second image.

14. The method of claim 13 wherein the first position and the second position are the same location wherein an angle of orientation of the camera is different between the first position and the second position.

15. The method of claim 13 further comprising:
    constructing a panoramic image using the first image and the second image.

16. The method of claim 13 wherein capturing the first image and capturing the second image occur at two different points in time.

17. The method of claim 13 wherein the panoramic image is a surround image.

18. An apparatus for constructing panoramic images comprising:
    a lens assembly;
    a light-sensitive detector to capture a plurality of images generated by the lens assembly;
    a motor to rotate the lens assembly;
    a decoder to determine a corresponding orientation of the lens assembly when each of the plurality of images is captured; and
    a processor to generate at least one panoramic image by combining at least two images of the plurality of images and the corresponding orientation of the lens assembly for the images.

19. The apparatus of claim 18 further comprising a tilt actuator to tilt the lens assembly to a desired angle.

20. The apparatus of claim 19 further comprising an encoder to determine the amount of tilt of the lens assembly when the image is recorded.

21. The method of claim 1 wherein the processor computes when the camera is at the second orientation.

22. The method of claim 13 further comprising:
    alerting the user when the camera is in one of a plurality of positions suitable for capturing the second image.

23. The method of claim 13 wherein the position suitable for capturing the second image is defined such that an overlap of the first image and the second image is approximately a minimum required overlap.

24. The apparatus of claim 18 further comprising:
    a control to direct the motor to move the lens assembly to a series of orientations such that the plurality of images can be captured by the light-sensitive detector.

25. The apparatus of claim 18 further comprising:
    a processor to construct a panoramic image by combining the plurality of images and the orientation.

* * * * *